GLIDING SURFACE AND GLIDER FOR USE THEREWITH

Filed Nov. 8, 1967 3 Sheets-Sheet 1

INVENTOR.
Harry S. Nagin.
BY Parmelee, Utzler + Welsh
Attorneys.

GLIDING SURFACE AND GLIDER FOR USE THEREWITH

Filed Nov. 8, 1967 3 Sheets-Sheet 2

INVENTOR.
Harry S. Nagin.
BY Parmelee, Utzler & Welsh
Attorneys.

GLIDING SURFACE AND GLIDER FOR USE THEREWITH

Filed Nov. 8, 1967

INVENTOR.
Harry S. Nagin.
BY Parmelee, Utzler & Welsh
Attorneys.

United States Patent Office 3,497,211

Patented Feb. 24, 1970

3,497,211
GLIDING SURFACE AND GLIDER FOR USE THEREWITH

Harry S. Nagin, 191 Presidential Blvd., Bala Cynwyd, Pa. 19004

Filed Nov. 8, 1967, Ser. No. 681,414
Int. Cl. A63g *21/04;* A63c *11/00;* E04f *15/00*
U.S. Cl. 272—56.5 23 Claims

ABSTRACT OF THE DISCLOSURE

A gliding surface for use in activities such as skating, skiing or utilizing a vehicle of some type with the skate, ski or vehicle having a specially constructed runner or gliding element. The gliding surface may be formed of a selected thermosetting or thermoplastic resin with either a glossy smooth surface or with irregularities, while the skate, ski or other gliding element is comprised of a resin having a very low coefficient of friction, but having associated therewith a friction surface that may be selectively utilized to provide forward thrust, braking or guiding qualities when required.

This invention relates to sport, amusement and transportation activities of the type generally available only where an icy or packed snow surface is available, and which may be generally grouped under the term gliding, since motion occurs by the sliding of one surface on another, as for example, a skate on ice or a ski on packed snow, or a sled on a slippery slope.

The invention will here be described in most detail in connection with skating, since this is a preferred embodiment, but without exclusion of other sliding or gliding activities as above mentioned.

By way of background, it is of course known that conventional ice skating on a rink or outdoor area requires an expanse of smooth ice which, because of the cost of refrigeration, can be economically enjoyed or practised only in areas and at times when the natural climate or the environment of the rink is cool or cold enough to keep the ice in condition. In skating, a steel blade or runner which in most cases is hollow-ground to provide parallel sharp edges therealong, presses against the ice, imperceptibly melting the ice, and the skate moves over a film of water. Thrust and braking are obtained by the blade being turned sideways, or at least diagonal to the line of travel, and, in some instances, the toe of the runner, which is either pointed or rounded and serrated, is dug into the ice.

The present invention involves a somewhat different concept, where the skating surface is relatively slippery or low-friction surface, and the movable element, herein called the runner, such as the blade of the skate, has a lower coefficient of friction as compared to the skating surface. For example, the skating surface may be formed of plastic, such for example, as styrene cut-back polyester, known generally simply as polyester, or epoxy resin may be used as the gliding or skating surface, either with or without a filler, and also many variations of these are adaptable for the purpose.

The skate itself has a runner portion that contacts the skating surface comprised of a self-lubricating plastic such as TFE (polytetrafluoroethylene), acetal homopolymer (better known under the trademark Delrin) and nylon, these being listed in the order of preference, and combinations thereof, as for example acetal homopolymer with TFE strands.

The runner of the skate need not be hollow-ground. To prevent uncontrolled side slip, since the runner cannot cut into the skating surface in the manner of the runner of a steel skate on ice, either or both of two expedients may be used. This involves the use of a friction material that will not normally impede forward movement of the runner in the direction of travel. One of these, in the case of a skate, is the provision of a high friction strip along each side of the runner which are located flush with or at a level slightly above the edge of the runner in such a manner that if the skate is tilted slightly to one side or the other, one of these strips will contact the skating surface to provide thrust or braking action, and such material may also be provided on the nose or front end of the runner. With other sliding surfaces, the friction elements may be otherwise arranged.

The second expedient is to provide slight irregularities on the skating surface which offer sufficient resistance to a broadside or transverse thrust of the blade of the skate, but little impedance to the travel of the blade in the direction of its length.

The invention may be more fully understood by reference to the accompanying drawings wherein.

Figure 1:
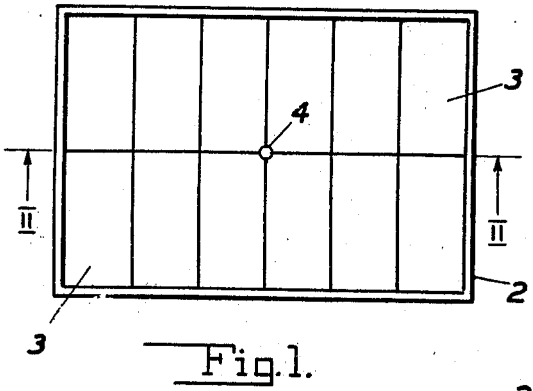
FIG. 1 is a more or less schematic plan view of a skating surface with an earthen foundation.
Figure 3:
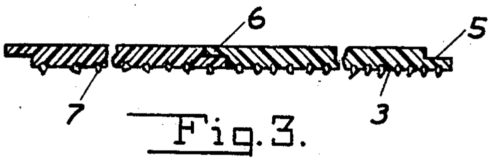
FIG. 3 is a fragmentary view on an enlarged scale showing in transverse section a joint arrangement between panels as used in FIG. 2.
Figure 2:
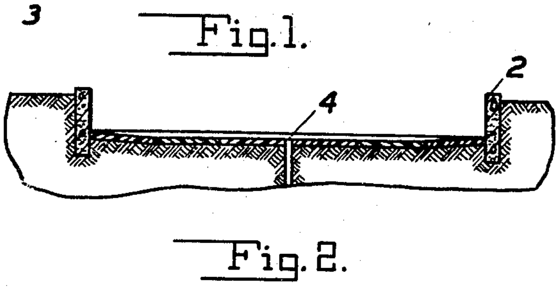
FIG. 2 is a longitudinal section in the plane of line II—II of FIG. 1.

The skating surface itself is preferably formed of precast plastic slabs or panels of uniform size. For an outdoor skating area the arrangement shown in FIGS. 1 and 2 may be employed. Preferably a shallow excavation is made in an available outside area and a concrete curb 2 is formed around it. The excavation will vary in depth, but is generally at or below the level of the normal frost line in the latitude where the surface is installed. The curb is cast in such size as to accept multiples of precast panels designated generally as 3. The earth on which the panels are to be placed is suitably graded and packed. As shown in FIG. 2, the grading may be such that the panels 3 at the two ends of the rectangular area are sloped slightly toward the center, and the ends of all of the panels 3 along each side may slope slightly toward the center, and there may be a drainage opening at the center so that any accumulation of water, either for hosing off the surface or resulting from natural precipitation, may be drained away. The slope or banking of the skating surface to make it higher gives the skater on a small rink better control, and is an expedient not obtainable on an ice surface. This drain is indicated at 4. In FIG. 1 the panels are shown in end-to-end and side-by-side relation with the length of the panels extending crossways of the rectangular area, and with the ends of each transverse pair of panels meeting at the center. As shown in FIG. 3, the panels may have overlapping rabbeted joints with each panel 3 having a lower lip 5 extending from one edge and one end, and an upper lip 6 extending from the top of the other edge and other end so that the lip 6 of one panel will overlap the lip 5 of the adjacent panel. If desirable, the panels may be cast in such a manner that elements 7 such as coarse gravel may be partially embedded in the underside to form keys that will key into the earth to more firmly anchor the panels in the earth.

Should there be any crevices around the panels adjacent the curb, or should there be any cracks between the overlapping lips of adjacent panels, these may be filled in with a plastic similar to that from which the panels themselves are formed. If desirable, earth or sand forming the bed on which the panels rest may be first sprayed with plastic which cures without pressure at room temperature as the panels are put down, so that the earth will be bonded and firmly hold the panels against accidental removal.

Figure 4:
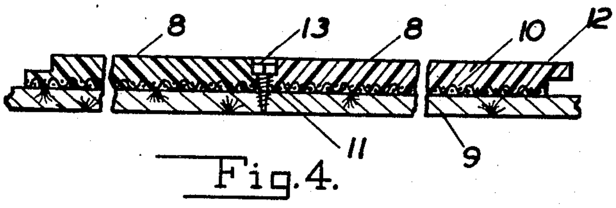
FIG. 4 is a view similar to FIG. 3 showing the panels comprised of plastic and plywood for use on an indoor area.

Typical panels may be of the order of 4 to 8 feet, and several of them together form the skating surface. If the panels are to be used indoors, they may be formed on a plywood base as shown in FIG. 4. In FIG. 4 each panel is designated 8, and it is formed against a plywood base 9. There may be anchoring means projecting from the plywood to more firmly bond the plastic to the base. For example, a layer of expanded metal 10 such as the expanded metal commonly used in plastering walls is stapled onto the surface of the plywood against which the plastic is cast. In this case also the panels are provided with overlapping tongues and lips 11 and 12 corresponding to the lips 5 and 6 of FIG. 3. The panels may be secured together by countersunk lag screws or other fasteners as indicated at 13, and the recessed heads of these fasteners may be subsequently covered with a plastic composition, preferably a thermoplastic which can be removed in the event the floor is taken up. This is particularly true of floors which are intended to be transported from one place to another. In such case the panels may be made larger, up to the area of a standard flat bed truck in length and width. They may not be wider than 8 feet or longer than 40 feet to be hauled about on a truck, and preferably they will be shorter for easier handling.

In order to secure uniformity and accuracy and to reduce cost, the panels are cast in a form in a manufacturing environment where temperature conditions can be controlled, and where artificial heating may be used to facilitate the curing of the plastic. The resins which are preferred for this purpose are commercial grade polyester, which, as is well known, is a styrene modified ester, sometimes referred to as styrene cutback polyester, or it may be formed of an epoxy resin such as those available under the trademarks "Epon" and "Araldite," these being polyglycidal ether types derived from bisphenol and epichlorohydrin. They should be free-flowing liquids when combined with a curing agent which, when poured into a shallow mold, will be self-leveling. Usual hardeners or curing compounds are, of course, used.

Figure 5:
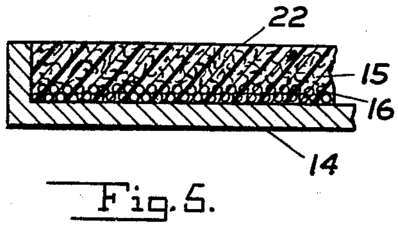
FIG. 5 is a fragmentary vertical section showing one manner of forming the skating surface.

The resin is preferably cast against a smooth mold surface as indicated at 14 in FIG. 5, the numeral 15 designating the body of resin itself which, in any case, may contain a filler, preferably glass fibers, selected fine clay, or other well-known fillers. The surface 14 against which the resin is cast may be smooth metal covered with a release agent to which the resin will not bind. After the resin has been cast and hardened, it is removed from the mold and the smooth surface formed against the mold area 14 is then turned upwardly and constitutes the skating or sliding area of the panel. When a plywood panel with anchoring means such as expanded metal is used, the wood panel is turned anchoring face downward on top of the form so that its surface slightly contacts the liquid resin in the mold.

The two thermosetting resins above described, that is, polyester and epoxy resin, are the preferred materials to be used for this purpose because of the fact that they may be cast and will curve without pressure at room temperature, and because of the fact that they are thermosetting, and of importance is the fact that the surface of such resins, particularly when molded against a smooth base such as 14, has a low coefficient of friction, and is therefore relatively smooth and slippery. Such a surface may be used in this condition with a skate or other sliding element of proper character, but it may be desirable that the skating surface be slightly roughened in order to give the necessary thrust or braking effect, as the case may be, when the skate is turned sideways to propel the skater forward, or to stop.

Figure 6:
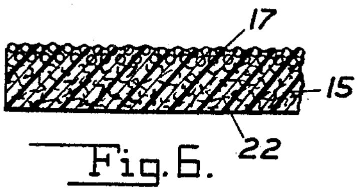
FIG. 6 is a similar view of the finished skating surface of FIG. 5.
Figure 7:
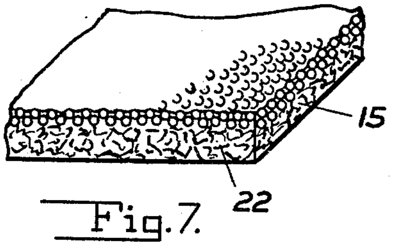
FIG. 7 is a perspective view of a fragment of the panel shown in FIG. 6.

One such surface may be provided as shown in FIG. 5 by covering the base 14 of the mold with small glass beads, or relatively coarse particles of sand. The liquid resin, when it is poured in on top of the layer of beads, sand or other solid particles, will wet these particles and flow around them to such extent that they will not form a gritty surface, but will form tiny humps or bubble-like protrusions over the surface of the panel. In FIG. 5, 16 designates such a layer of beads and in FIG. 6, 17 desigsates the small humps or irregularities which result from the use of such particles. This is also indicated in FIG. 7 where it will be seen that the tiny humps or irregularities in the surface are haphazardly arranged. When the edge of the skate is turned slightly sideways as is customary in stroking or stopping, this edge will bear against a sufficient number of these irregularities to give the required thrust or braking effect. At the same time, when the skate runner is moving in the direction of travel of the skater, the skate will glide over them with practically no impediment, due to the fact that the skate is simultaneously riding on the tops of many of these irregularities, and encounters them in succession instead of striking against a number of them at one time as it does when the skate runner is broadside to the direction of travel.

Figure 8:
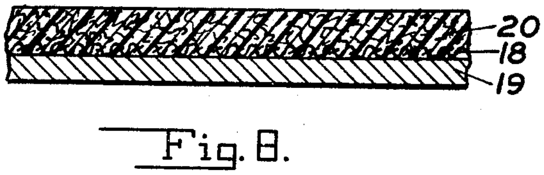
FIG. 8 is a view similar to FIG. 5 showing another manner of forming the skating surface.
Figure 9:
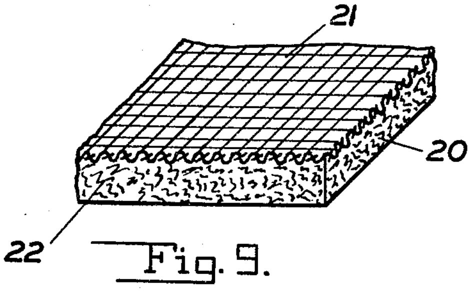
FIG. 9 is a fragmentary perspective view of the completed surface formed in FIG. 8.

Another way of securing this slightly roughened or irregular character is indicated in FIG. 8 where a layer of coarse glass cloth 18 is spread over the mold surface 19 and the resin 20 is poured in on top of the glass cloth and permeates through it. This forms intersecting lines 21 when the plastic has hardened and the plastic body is inverted. This is indicated in FIG. 9. The pattern so produced is of course the image of the interstices between the strands of the cloth fabric. In either FIGS. 5 to 7, or in 8 and 9, the main body of the plastic may be strengthened by mixing glass fibers or other filler with the plastic. These fibers are designated 22 in FIGS. 5 to 7 and 8 and 9.

Of course, instead of using either glass beads or glass cloth, the mold surface itself may be roughened to provide some equivalent roughening of the surface of the plastic which is cast against it.

Figure 5A:
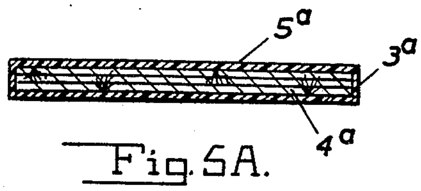
FIG. 5A is a sectional view of an alternate form of panel.

As an alternate method of forming the panels 3, laminated plywood sheets of approximately ¾ inch thickness may be dipped into a container containing either polyester or epoxy resin which will envelop the entire panel. Such a panel is shown in FIG. 5A and is designated as 3*a*. The panel 3*a* comprises a sheet of plywood 4*a* having an enveloping layer 5*a* of either of the above mentioned plastics. By this procedure of dipping the plywood sheet 4*a*, a smooth film of plastic may be obtained which is thinner than would be produced by the above mentioned casting technique making production of the panels more economical. Also, the coating on the underside of the panel protects the undersurface of the panel. Further, the sheet 4*a* provides a reinforcement for the plastic and together with the thinner coating of plastic provides a slight resiliency to the panels which is desirable.

Instead of using a conventional metal skate on this low-friction surface of thermosetting resin, I contemplate the use of a specially formed skate, the runner surface of which is formed of a plastic having a lower coefficient of friction than the skating surface itself. This is somewhat the reverse of the conventional condition where the steel blade of a skate, moving over ice, melts the ice so that the steel actually moves on a film of water and the skating surface itself is the primary anti-friction surface, while the skate cuts into it. The runner surface of the skate is preferably formed from TFE or acetal homopolymer as above described, or nylon, these being preferred in the order named, insofar as their low coefficients of friction are concerned, but from the standpoint of strength, acetal homopolymer, especially combined with TFE, may be most satisfactory. As is well known, TFE probably has the lowest coefficient of friction of any known resin. This slippery property is often referred to as "self-lubricating" property.

Figure 11:
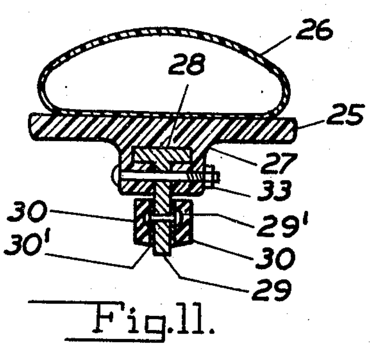
FIG. 11 is a transverse section in the plane of line XI—XI of FIG. 10.
Figure 10:
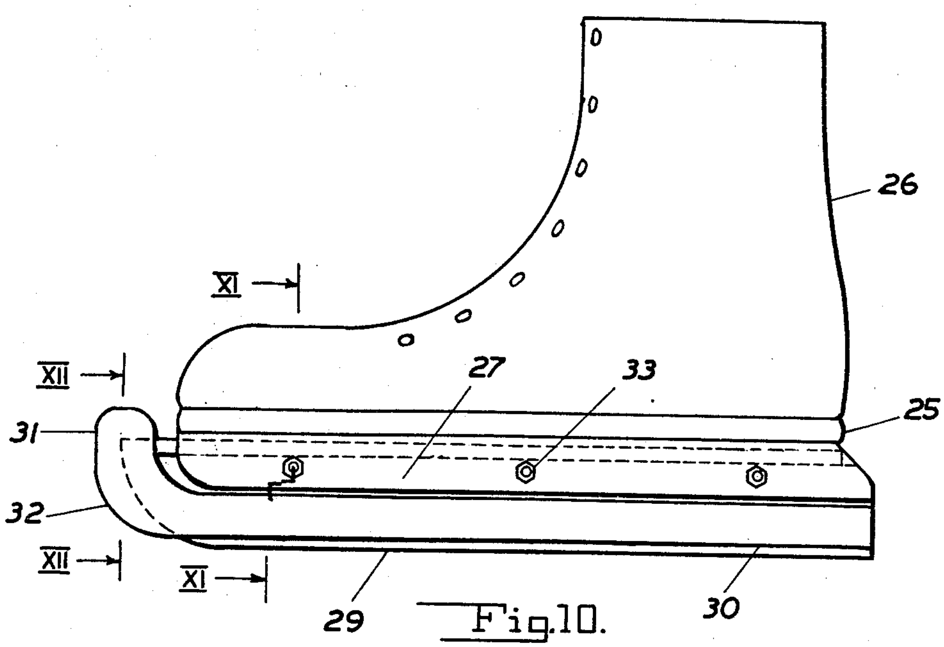
FIG. 10 is a side elevation of a form of skate for use on the surface.
Figure 12:
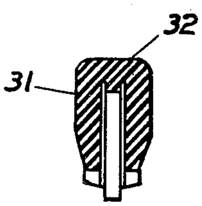
FIG. 12 is a similar section in the plane of line XII—XII of FIG. 10.

While the skate may comprise a conventional steel skate to which is fitted or applied the low friction resin, I prefer to use a construction generally as shown in FIGS. 10, 11 and 12. In these figures, 25 designates a platform which may comprise the sole of a shoe, the upper of which is designated 26. Both may be of plastic, and may be integrated or formed integrally. On the underside of the sole or plate portion 25 there is a depending rib structure 27 having a T-shaped slot or channel extending longitudinally thereof as indicated at 28 with the slot opening downwardly. The runner 29 is of a T-shape to be slidably fitted into the T-shaped channel 28 with the stem of the T which forms the runner projecting below the structure 27. The runner may be of any desired width, but normally a width corresponding roughly to the width of a steel skate, i.e., ¼ to 3⁄16 of an inch thickness is desirable and instead of being hollow-ground like the usual steel skate runner, the runner has square corners 29 along its lower edge, and the bottom is flat. Mechanically bonded as by rivets 29′ to each side of the runner is a metal plate 30′ to which is bonded a strip of friction material such as a soft or elastic natural rubber rib 30 having an undersurface which slopes upwardly away from the runner, and which is spaced upwardly from the corner or edge 29 a small fraction of an inch, perhaps 1⁄16 to 3⁄32 of an inch being the spacing between the corner 29 and the sloped underface of each of the ribs 30. At the front of the runner the ribs 30 merge into a rounded body 31 of natural rubber that envelops the whole front end of the runner and is substantially thicker than the runner so as to present a wide toe surface 32.

The runner may be fixed against longitudinal movement relative to the shoe by one or more transverse fastening elements, such as bolts 33, passing transversely through the rib 27 and through the runner.

Soft natural rubber, such as that which extends along the sides of the runner and over the toe, has a high coefficient of friction when pressed hard against even a smooth glossy plastic surface. With the skate arrangement, when the skater inclines his foot one way or the other, as is done in ice skating when "stroking" to get forward speed, or is turned sideways in braking, one of the rubber strips presses against the skating surface to prevent side-slip. Also, skaters often dig the top of their skate into the ice to start, or stop. The rubber end 32 can be used in a similar manner. If the skating surface is roughened in the manner described, the corner edge of the skate runner will also get a "bight" on the skating surface to reduce or prevent side-slip.

Figure 10A:
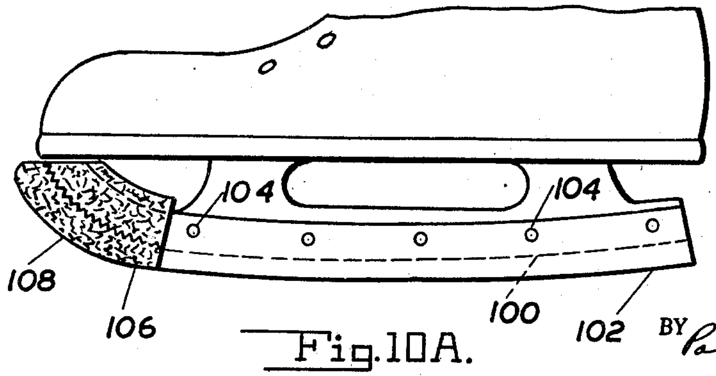
FIG. 10A is a side elevation of another form of skate for use on the surface.

In FIG. 10A, I have illustrated a conventional steel figure skate having a curved blade as opposed to a speed skate having a straight runner as is shown in FIG. 10. The figure skate has fitted to the blade 100 an elongated U-shaped runner 102 preferably formed from TFE or acetal homopolymer or nylon as above described. The runner 102 may be mechanically fastened to the blade 100 by rivets 104. At the front of the runner 100 is a rounded body portion 106 enveloping the serrated portion of the blade 100 to present a wide toe surface 108.

The rounded body portion 106 is formed of an epoxy resin or polyurethane or polyester similar to that which forms the panels 3 and has a filler of vulcanized rubber particles therethrough. With such a construction, the toe or portion 106 has a high coefficient of friction when pressed hard against the surface of plastic panels 3 and may be utilized in a fashion similar to the rubber end 32 of the skate shown in FIG. 10.

It must be appreciated that even a trained ice skater will be required to learn skating techniques with this type of surface and skates, but basically it will simulate ice skating.

In order to increase friction between the gliding surface and the skate runner, rosin may be applied to the skate runner either in lump form or applied thereto in the form of a spray which contains the rosin and an organic solvent, which evaporates instantly such as methylene chloride. The increased friction resulting from use of rosin is of great help to a skater lacking experience in this form of skating. As the skater's experience and skill increased he would lessen the amount of rosin and thereby decrease the friction between the gliding surface and skate runner.

Figure 13:
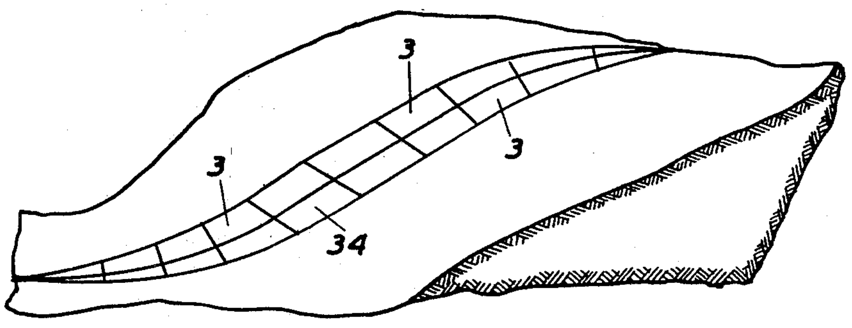
FIG. 13 is a perspective view illustrating the invention embodied in a ski slope, the view representing a natural earth slope with the ski run formed thereon.

To simulate skiing, the panels may be arranged on a natural slope graded in the manner above described for a rink, or on a trestle-like structure, or even in elongated relatively flat stretches to simulate cross-country skiing. In FIG. 13 I have illustrated the panels 3 arranged in parallel rows down a slope to form a track or run 34, and the earth under the panels has been graded, tamped and otherwise prepared, preferably with some plastic bonding material as described in connection with FIGS. 1 and 2. The surface may be smooth, but is preferably slightly roughed or irregular, as described in connection with the skating surface.

With skiing, as with skating, the runner or sliding surface of the ski is preferably formed of one of the three plastics having a low coefficient of friction. A ski which may be of wood, plastic or light metal, such as aluminum, is much like the conventional ski. It is designated generally as 35, with an upturned toe 36, a middle arch 37 to provide spring, and a tail 38. Any usual or preferred binding is secured over the arch, as indicated at 39. There is a layer 40, preferably of one of the three plastics above named, having a low coefficient of friction, secured over substantially the entire bottom surface of the ski so that it will move easily over the plastic track 34.

Since the track is a slippery, glassy surface, the ski is modified in some way to give the wearer proper control for steering and preventing side-slip. For this purpose there is a recess 41 in the tail of the ski in which there is a freely-rotatable deformable natural rubber roller 42 on a shaft or axle 43, the roller being preferably of a width nearly as wide as the ski. There may be a similar roller 44 in a recess 45 on a shaft 46 forwardly of the arch of the ski.

When one is standing on the ski, the rollers tend to flatten so that the gliding surface or runner portion 40 of the ski rides on the plastic track, but the rollers turn freely. However, they effectively retard side-slip, since the rollers cannot rotate in the direction of their long axes, so that the skier can control the skies with his feet as he may a conventional ski on light snow over an icy base. One roller at the tail of the ski provides a fulcrum with the foot of the wearer to control direction, but better control is secured with two rollers as shown. A turn may be made by concentrating and lightening the pressures on the appropriate edges of the skies, as in snow skiing. Because of their resilience, the rollers do not keep the ski surface away from the sliding surface, as would rigid rollers, but they provide continuous friction against side-slip.

Figures 15, 17:
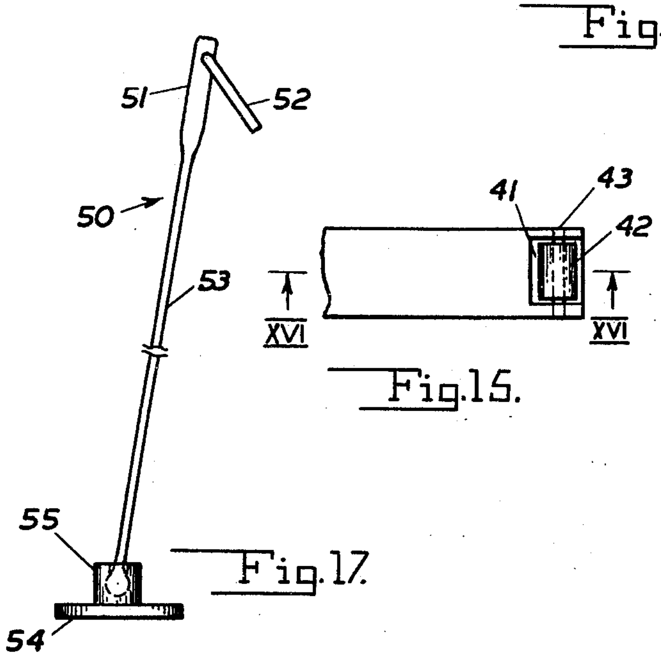
FIG. 15 is an enlarged fragmentary view showing in plan the underside of the tail of the ski.
FIG. 17 illustrates a ski pole for use on this surface.
Figure 16:
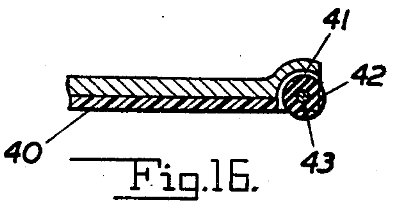
FIG. 16 is a longitudinal vertical section in the plane of XVI—XVI of FIG. 15.

Ski poles may be provided with natural soft rubber pads, instead of steel points, as shown in FIG. 17 where the pole 50 has a handle portion 51, a wrist loop 52, a shank 53, and at the lower end of the shank, a soft natural rubber disk 54 with a central boss 55 in which the shank is secured. This pole may be thrust against the track for control or for propulsion on level surfaces in the familiar manner that ski poles are used.

Figure 13A:
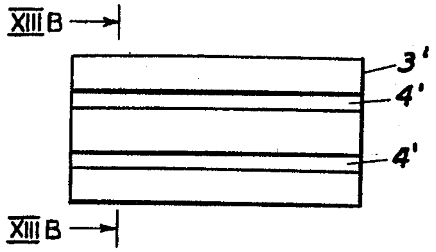
FIG. 13A is a plan view of an alternate form of panel illustrating a guideway therethrough.
Figure 13B:
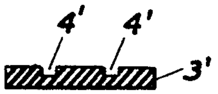
FIG. 13B is a transverse section in the plane of line XIII—XIII of FIG. 13A.
Figure 14:
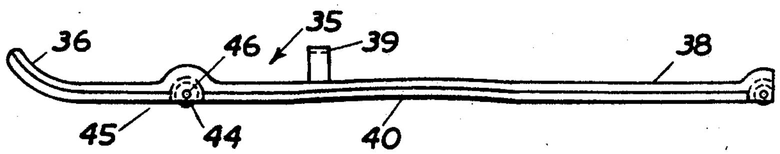
FIG. 14 is a side elevation of a form of ski adapted for use on this surface.

As an alternative, the track 34 may comprise panels 3′ as illustrated in FIGS. 13A and 13B which are similar in construction to panels 3 but which include depressions or guideways 4′. The panels 3′ would be arranged in parallel rows down the slope with the guideways of adjacent panels cooperating with one another to form continuous paths through which the skies would travel along the elongated runway.

Figure 18:
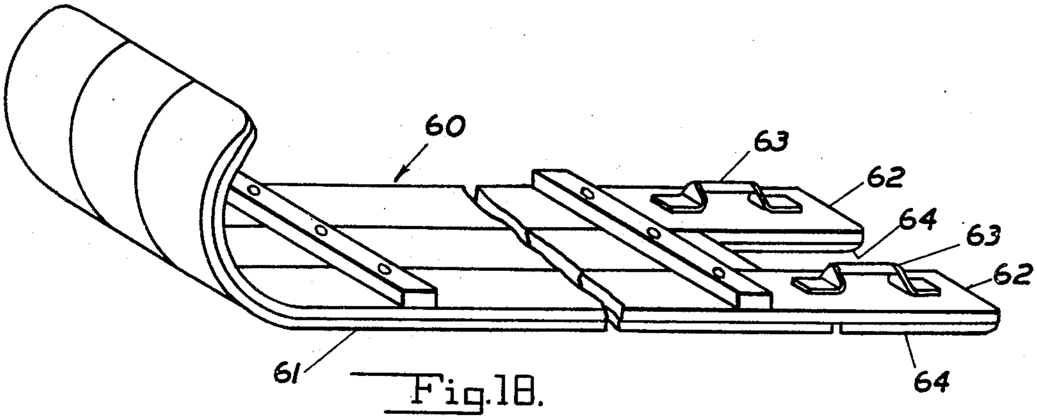
FIG. 18 is a perspective view of one form of vehicle such as a toboggan for use on the gliding surface.

A toboggan or other vehicle for use on a slope formed this way may be constructed much like the ski with rubber rollers as described in connection with the ski, but of course in this case the vehicle is longer and wider so that one or more persons may be seated on it. Preferably, however, the toboggan is constructed as shown in FIG. 18 where 60 designates generally a toboggan made more or less in the usual way, usually from a plurality of strips of wood secured together with cross strips on the top. However, the undersurface is covered with a layer 61 of a plastic having a lower coefficient of friction than the guiding surface itself. It is preferably comprised of one of these three materials used on the skate runner or modifications thereof, and forms the running surface or sliding surface of the toboggan.

At each side of the tail end of the toboggan there is an extension which may comprise the thin slats of which the toboggan is formed. These extensions are designated 62, and each has a handle 63 secured to the top thereof. On the underside of these extensions there is secured a pad 64 of natural soft rubber of the type used on the skate or the ski. The occupant riding the toboggan, or the one at the rear end of the toboggan if there be more than one occupant, holds onto the handles 63 and to brake the forward movement of the toboggan, may bear down on these handles and bring the rubber pads 64 into pressure contact with the gliding surface over which the toboggan is moving. By pressing down on one handle alone, he can steer the vehicle and hold it on course by controlling the pressure on these handles.

The form of panels illustrated in FIGS. 13A and 13B may also be used in conjunction with a toboggan run, however, the guideways 4′ would necessarily be increased in size to accommodate the width of the toboggan.

While I have specified polyester and epoxy resin as being the preferred materials to be used for the gliding surface, others resins may be used, as for example, polyurethane resin where there is a water-cured coating system utilizing diisocyanate prepolymers that cure upon contact with moisture from the air and are therefore referred to as air-cured urethane coatings. This type of resin, while less densely cross-linked than those mentioned as preferable, are nevertheless relatively low friction materials and are not susceptible to change after curing.

With any of the resins used as the gliding surface, should it be desirable to still further lower the coefficient of friction, this may be done in various ways, for example, if there be added to the polyester and its curing agent a filler of very finely-divided powdered TFE in the range between about 7% by weight and 10% by weight and the mixture spread in a thin layer, the resin will harden with an even more smooth, slippery surface which will retain its slippery quality.

Alternatively the resin may be spread in a layer over the supporting base and the mold surface on which it is poured may have powdered TFE liberally sprinkled thereover so that it will be bonded into the surface of the resin as the resin gels. The same procedure using a powdered resin lubricating filler may be used with epoxy resin and polyurethane. Below 7% by weight, the powdered resin is too thinly dispersed to be of much avail, and little gain is secured going above 10% by weight, which is roughly about 20% by volume if TFE is used.

As an alternative, the skating surface may be compounded with a lubricant that will be gradually released over an extended period of time.

If a mixture is prepared of one of the thermosetting resins above described and an incompatible lubricant, such as mineral oil, vegetable oil, vegetable wax or liquid silicone resin, and the mixture is cured in a flat layer, the lubricant tends to escape to the surface, but is trapped by the cross-linking of the resin molecules. A lubricant-rich layer is thus produced which exudes lubricant to the surface for an extended period of time. Such a surface may be cleaned and be sufficiently porous to absorb a replacement lubricant when the initial lubricant is exhausted.

Typical lubricants are carnauba wax, soybean, rapeseed, cottonseed or other vegetable oils may be used in a natural or hydrogenated condition, silicone fluid resin or oil, mineral oils and waxes of an aliphatic or naphthenic type, and fatty acids, the mono- and di-esters of aliphatic and aromatic mono- and di-acids. Aromatic type mineral oils are generally too compatible with the resin to be satisfactory.

The lubricant may range between 7% and 20% of the weight of the resin and curing agent, 10% giving a good result.

Thermosetting resins are preferred for the gliding surface because of the fact that they are less likely to be damaged than the slippery but softer thermoplastic resins such as polyethylene, and the thermosetting resins will not be affected by any heat of friction or by variations in climate conditions, and are more stable against "creeping." Thermoplastic resins, however, may be conveniently used in crevices between adjacent panels, or as mentioned previously, over fastening bolts that are countersunk in the skating surface, and the runner portion of the gliding element is, of course, a thermoplastic of an extrudable character, and which has adequate strength. Its coefficient of friction on steel should not preferably be higher than 0.1. If the rink or track surface becomes damaged or excessively rough after a period of use, a thin film of thermosetting resin similar to that from which the surface is formed may be spread over it to restore its slippery, glossy surface.

The gliding surface as thus provided can be used in any climate, and at extremely low temperatures or in warm, sunny places. It can be used when it is wet or covered with snow, and as a matter of fact, is more slippery when it is wet.

The panels are relatively cheap and are preferably made in a size that can be readily handled. Where the resin panel is set directly on the ground, it is usually desirable to make it thicker than where it is used on plywood. Since the skate or other runner surface has a coefficient of friction lower than the rink or runway over which it is moving, usual provisions for preventing side-slip used on steel skates or other gliding or sliding elements are not effective, for which reason the runner must be provided with some associated friction element that is more or less selective in the manner in which it exerts a restraining influence. I have particularly specified elastic natural rubber since it appears to have the greatest coefficient of friction when pressed hard against the gliding surface, but synthetic rubbers are not excluded, but in any case the rubber should be relatively yieldable and elastic. Natural rubber may be compounded of course with carbon black or other filler as is customary, as long as its resilience is retained.

It will of course be understood that with the low coefficient of friction between the runner and the gliding surface, the use of the gliding surface on level stretches as well as on slopes to form an extended area or track may be provided, either for skiing with the aid of poles, or for a wheelless vehicle that may be propelled by a propeller, or by a pneumatic jet means mounted on or acting against the vehicle.

I claim:

1. A gliding surface comprising an area comprised of a plurality of panels in abutting relation, each panel having a slippery, hard glossy surface of thermosetting resin having a low coefficient of friction selected from the group consisting of polyester, epoxy resin and polyurethane.

2. A gliding surface as defined in claim 1 wherein the resin overlies and is secured to a supporting wood base panel.

3. A gliding surface as defined in claim 1 wherein the resin is selected from the group consisting of cured polyester, epoxy resin of the type produced by reacting bisphenol and epichlorohydrin, and polyurethane, the resin having a filler to decrease the coefficient of friction, said filler being selected from the group consisting of TFE, acetal resin and nylon, with the filler ranging between 7 to 10% of the combined weight of the filler and first-named resin.

4. A gliding surface as defined in claim 1 wherein the panels are arranged in end-to-end and side-by-side relation to provide a skating area.

5. A gliding surface as defined in claim 1 wherein the panels are arranged in end-to-end and side-by-side relation to provide a skating area, the panels at the outside of the area being sloped toward the center to provide a banked peripheral surface around the entire surface.

6. A gliding surface as defined in claim 1 wherein the resin panels have particles therein under the glossy hard surface which form small irregularities over the surface.

7. A gliding surface as defined in claim 1 wherein the panels are arranged to form an elongated gliding surface, the length of which substantially exceeds the width.

8. A gliding surface as defined in claim 1 wherein the panels are arranged on an incline and provide an elongated gliding surface sloped in the direction of its length with the length greatly exceeding the width to provide an elongated runway.

9. The combination with a gliding surface as defined in claim 1 of a gliding element arranged to slide thereon having a runner surface comprised of plastic having a coefficient of friction lower than that of the panel surfaces.

10. The combination defined in claim 9 wherein the runner surface has a coefficient of friction on steel at least no greater than 0.1

11. The combination defined in claim 9 wherein the runner is comprised of a resin selected from the group consisting of TFE, acetal resin, nylon, and combinations thereof.

12. The combination defined in claim 9 wherein the gliding element is a skate.

13. The combination defined in claim 9 wherein the gliding element is a toboggan-like element on which a rider may sit, and selectively operable means on said element arranged to be selectively pressed when required into contact with the gliding surface comprised of a material which has a high coefficient of friction on the gliding surface when pressed thereagainst.

14. The combination defined in claim 9 wherein the gliding element is a toboggan-like element having front and rear ends on which a rider may be seated with the runner extending along the undersurface thereof, the element having two spaced extensions at the rear end thereof, one of which is located at each side of the longitudinal axis of the element which may be flexed in a direction normal to the surface thereof, said extensions having flat rubberous pads of high friction material thereon arranged to be selectively pressed against the gliding surface when the element is moving thereover.

15. A skate for use on a low friction gliding surface, said skate having a runner with a coefficiet of friction lower than that of said gliding surface and means comprised of a high friction material on said runner arranged to be selectively moved into contact with the gliding surface providing side thrust, braking, and control side slip of said runner on the gliding surface.

16. A skate for use on a low friction gliding surface as defined in claim 15 wherein said runner has an elongated blade with an upwardly-turned front portion, said front portion having a surface covering of a high friction material.

17. A skate for use on a low friction gliding surface as defined in claim 16 wherein a portion of the runner is comprised of a resin selected from the group consisting of TFE, acetal resin, nylon, and combinations thereof.

18. For use on a hard glossy slippery plastic surface, a skate having a replaceable runner secured thereto, the runner having an edge for riding on the gliding surface and having ribs of high friction material extending therealong located above the bottom surface of the runner sufficiently to normally clear the gliding surface when the skate is upright, but arranged to contact the gliding surface when the skate is slanted in a direction transverse to the length of the runner.

19. For use on a hard, glossy, slippery plastic surface, a skate as defined in claim 18 wherein said runner has an upwardly-turned front portion, said upturned front portion being also covered with said high friction material.

20. The combination with a gliding surface comprised of panels arranged in fixed relation, said panels all having a slippery, hard glossy surface formed of a thermosetting resin in which is incorporated a lubricant and arranged to provide an elongated sloping surface, of an elongated runner element in the form of a ski arranged for sliding on said surface having a plastic under surface for sliding on the gliding surface, and means on the runner arranged to retard side slippage of the runner in a direction transverse to its length, but ineffective to retard slippage in the direction of the length of the said element.

21. The combination defined in claim 20 wherein said last-named means comprises a roller of resilient material having a high coefficient of friction on the gliding surface with the axis of the roller transverse to the length of the runner element, the runner element having the resin therein in which the roller is received with the periphery of the roller projecting beyond said surface sufficiently to contact the gliding surface but insufficient to hold the under surface of the runner off said gliding surface.

22. A gliding surface formed of a succession of panels arranged in fixed abutting relation to one another, each panel having a continuous top layer of slippery, hard thermosetting resin having a friction-reducing filler incorporated therein selected from the group consisting of TFE, acetal resin and nylon and combinations thereof.

23. A gliding surface as defined in claim 22 wherein said top layer is comprised of a resin selected from the group consisting of polyester, epoxy resin and polyurethane.

References Cited

UNITED STATES PATENTS

| | | | |
|---|---|---|---|
| 150,896 | 5/1874 | See | 280—11.12 |
| 1,580,224 | 4/1926 | Tatro | 280—18 |
| 1,702,695 | 2/1929 | Hoult | 280—11.12 |
| 2,150,964 | 3/1939 | Dornseif | 280—11.18 |
| 2,253,012 | 8/1941 | Benner et al. | |
| 2,254,482 | 9/1941 | Heller | 272—56.5 |
| 2,509,603 | 5/1950 | Marin | 180—1 |
| 2,555,078 | 5/1951 | Gaylor | 280—11.12 X |
| 2,764,417 | 9/1956 | Sweet | 280—11.12 |
| 3,091,998 | 6/1963 | Wehr et al. | 272—56.5 X |
| 3,178,194 | 4/1965 | Buchmuller | 280—11.13 |
| 3,224,763 | 12/1965 | Hall. | |
| 3,350,092 | 10/1967 | Maki. | |
| 3,363,583 | 1/1968 | Greenberg | |
| 3,379,031 | 4/1968 | Lewis. | |
| 3,400,643 | 9/1968 | Holley. | |
| 3,414,284 | 12/1968 | Rosekrans et al. | 280—18 X |

LEO FRIAGLIA, Primary Examiner

MILTON L. SMITH, Assistant Examiner

U.S. Cl. X.R.

94—3; 272—3; 280—11.12, 11.13, 11.37, 18